United States Patent [19]

Ito

[11] Patent Number: 4,624,897
[45] Date of Patent: Nov. 25, 1986

[54] CLAD BRAZING FILLER FOR BONDING CERAMIC TO METAL, GLASS, OR OTHER CERAMIC AND COMPOSITES USING SUCH FILLER

[75] Inventor: Masaya Ito, Aichi, Japan

[73] Assignee: NGK Spark Plug Co., Ltd., Aichi, Japan

[21] Appl. No.: 618,784

[22] Filed: Jun. 8, 1984

[30] Foreign Application Priority Data

Jun. 17, 1983 [JP] Japan .................. 58-107650

[51] Int. Cl.⁴ .................. B32B 15/01; B32B 15/04; B32B 17/06; B32B 18/00
[52] U.S. Cl. .................. 428/432; 428/433; 428/434; 428/469; 428/660; 428/668; 428/671; 428/673; 428/674
[58] Field of Search .................. 428/432, 433, 434, 544, 428/660, 671, 673, 674, 901, 469, 668; 29/DIG. 4

[56] References Cited

U.S. PATENT DOCUMENTS 3,700,420 10/1972 Bristow .................. 428/673
4,029,479 6/1977 Parker .................. 428/660
4,350,743 9/1982 Lazzari .................. 428/901
4,448,853 5/1984 Fischer et al. .................. 428/660

Primary Examiner—Allan M. Lieberman
Attorney, Agent, or Firm—Sughrue, Mion, Zinn, Macpeak and Seas

[57] ABSTRACT

A clad brazing filler for use in bonding a ceramic to a metal, glass or another ceramic having a substantially different thermal expansion coefficient, and composites using such a filler. According to one aspect of the invention, a brazing filler of a clad type is provided which is composed of a titanium layer adjacent a silver, copper or silver-copper alloy layer, or a combination of silver and copper layers, with the titanium content being in a range of 3 to 80% of the total weight of the layers of the assembly. In accordance with another aspect of the invention, a brazing filler of the clad type is provided which combines the layer arrangement of the first aspect with either a layer of a metal having a low thermal expansion coefficient, a layer of a metal having a low Young's modulus, for a combination layer of both, arranged in any order.

2 Claims, 9 Drawing Figures

CLAD BRAZING FILLER FOR BONDING CERAMIC TO METAL, GLASS, OR OTHER CERAMIC AND COMPOSITES USING SUCH FILLER

BACKGROUND OF THE INVENTION

The present invention relates to a clad-type brazing filler for use in bonding ceramics either to themselves or to metals or glass (In the discussion below, reference is primarily made to the bonding of metals to ceramics, but it is to be understood that the invention applies as well to the bonding of any of these materials to ceramics.) The invention also relates to a composite prepared by using such a filler.

Ceramics are conventionally bonded to metals either by a high-melting method or by an oxide solder method. According to the first method, an alumina ceramic is bonded to Kovar by the following procedure: sintered alumina ceramic with a Mo-Mn paste coat is baked in a hydrogen furnace at 1,300° to 1,700° C.; the ceramic is plated with a nickel deposit on the Mo-Mn coat and heated in a hydrogen furnace at about 800° C. to form a metallized Ni layer; and the alumina ceramic having the Ni and Mo-Mn coats is bonded to Kovar by a silver-copper eutectic brazing filler. According to the oxide solder method, an alumina ceramic is bonded to niobium by the following procedure: a mixture of CaO, MgO, $Al_2O_3$ and $B_2O_3$ is coated onto a sintered alumina ceramic, and after forming thereon a layer of metallic niobium, the ceramic is heated at about 1,500° C. at a reduced pressure of $10^{-5}$ Torr.

However, both methods are only applicable to the bonding of articles whose coefficients of thermal expansion are close to each other. In addition, the high-melting metal method is complicated, whereas the oxide solder method, which requires the use of a vacuum, is not highly adapted to efficient bonding operations.

Nonoxide ceramics can be bonded to metals by a method which consists of first metallizing the ceramic either by metal vapor deposition or by a copper sulfate method, and then brazing the metallized surface of the ceramic to the mating metal. However, this method is disadvantageous in that heating is necessary for each of the two separate metallizing and brazing steps.

SUMMARY OF THE INVENTION

These defects of the conventional techniques are absent from the present invention which involves a simple heating operation and allows for the bonding of two articles whose coefficients of thermal expansion differ considerably. More specifically, the present invention provides a clad brazing filler for use in the bonding of ceramics to metals, as well as a composite prepared by using this brazing filler.

According to one aspect of the present invention, there is provided a brazing filler of a clad type composed of a titanium (Ti) layer adjacent a silver (Ag) layer, a copper (Cu) layer, a silver-copper (Ag-Cu) layer or a combination of Ag and Cu layers, with the Ti content being in the range of 3 to 80% of the total weight of the layers in the assembly.

Ceramics are not wetted well by most molten metals. However, Ag-Ti, Cu-Ti and Ag-Cu-Ti alloys have good wettability to ceramics. Ag-Cu alloy and Ti form a ternary eutectic upon heating which bonds well not only to ceramics but also to carbon steels, Ni and Cu. Therefore, two layers of Ag-Cu and Ti are used which act as a single brazing filler which binds the ceramic and metal strongly enough to provide their composite. According to the first aspect of the present invention, the single Ag-Cu alloy layer may be replaced by two separate Ag and Cu layers. Even in this case, Ag and Cu form a ternary eutectic with Ti upon heating and achieve the same advantages as described above. It is not critical which of the two layers, Ag and Cu, is placed in contact with the Ti layer.

If the Ti content is less than 3 wt% of the total weight of the Ti layer and the Ag, Cu or Ag-Cu alloy layer, titanium does not have a sufficient activity to provide strong bonding. If the Ti content exceeds 80 wt% of the total weight of the assembled layers, only a brittle alloy (brazing filler) is formed and a ceramic/metal composite having a strong bond cannot be obtained.

According to another aspect, the present invention provides a brazing filler of the clad type which combines the layer arrangement according to the first aspect with either a layer of a metal having a low thermal expansion coefficient, or a layer of a metal having a low Young's modulus, or a layer of each, which may be arranged in any order. If desired, the resulting brazing filler may be combined with another brazing filler.

Illustrative metals having low thermal expansion coefficients include W, Mo, Kovar, Fe-Ni 42 alloy, Invar, Cu-Mo alloys, Cr-W alloys and other metals having relatively small coefficients of thermal expansion. These metals serve as a buffer when the articles to be bonded have significantly different thermal expansion coefficients. Illustrative metals of low Young's modulus are Cu and Ag. Suitable metals of a low coefficient of thermal expansion and low Young's modulus may be properly selected depending upon the size and shape of the articles to be bonded. Especially by using a metal having a thermal expansion coefficient close to that of a specific ceramic, the residual stress that builds up in the ceramic after cooling is reduced. When a metal having a low Young's modulus is used, a bonded article having minimum strain can be obtained after cooling.

DESCRIPTION OF THE PREFERRED EMBODIMENTS

The brazing fillers of the present invention are hereunder described by reference to the accompanying drawings. A full understanding of the brazing filler will lead to a better understanding of the composite prepared by using this brazing filler.

Figure 1:
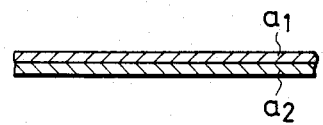
FIG. 1 is a cross section of a brazing filler structure of the clad type constructed according to a first aspect of the present invention.

FIG. 1 shows a brazing filler according to the first aspect of the present invention which has an Ag, Cu or Ag-Cu alloy layer $a_1$ clad with a Ti layer $a_2$. For making a metal-ceramic composite, either the $a_1$ or $a_2$ layer may be placed in contact with the ceramic. In another embodiment, the Ag-Cu alloy layer may be replaced by a combination of Ag and Cu layers, and in this latter case, it is not critical which layer (Ag or Cu) is in contact with the Ti layer.

Figure 2A:
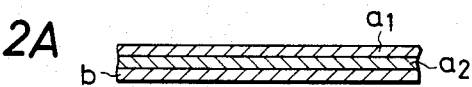
FIGS. 2A, 2B and 2C are cross sections of brazing filler structures of the clad type constructed according to a second aspect of the present invention.
Figure 2B:
Figure 2C:
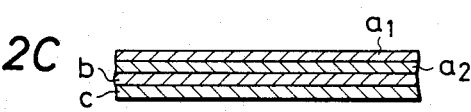

FIGS. 2A through 2C shows three examples of brazing fillers according to the second aspect of the present invention. In FIG. 2A, a low thermal expansion metal layer b is formed on the layer $a_2$ of the brazing filler shown in FIG. 1, and in FIG. 2B, this low expansion metal layer b is replaced by a layer c of a metal having a low Young's modulus. FIG. 2C shows the case where the two metal layers b and c are formed, in this order, on the layer $a_2$ of the brazing filler shown in FIG. 1.

The layer b or c or their combination may be formed on the layer $a_1$ rather than the layer $a_2$ of the brazing filler of the clad type shown in FIG. 1. The arrangement of layers b and c shown in FIG. 2C may be reversed. Furthermore, the two layers b and c may be combined with another bonding metal layer.

Figure 3:
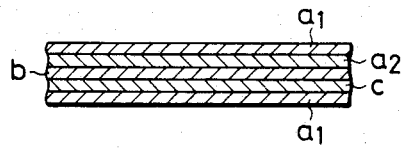
FIGS. 3 and 4 are cross sections showing specific embodiments of the present invention.
Figure 4:
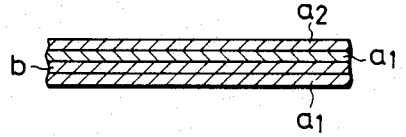

Specific embodiments of the brazing filler according to the present invention are shown in FIGS. 3 and 4. FIG. 3 shows a laminated structure wherein a Ti layer $a_2$, a layer b made of a low thermal expansion metal such as Mo, and a layer c made of a low Young's modulus metal such as Cu are sandwiched between two Ag-Cu alloy layers $a_1$. Each of the layers $a_1$, $a_2$ b and c achieves the function already described in connection with FIGS. 1 through 2C. The bottommost layer $a_1$ wets well metals other than stainless steel, high-carbon steel and ceramics, and hence adheres strongly to copper-base alloys, common iron and nickel. For bonding with stainless steel, high-carbon steel and ceramics, the bottommost Ag-Cu layer $a_1$ may be coated with another Ti layer $a_2$, the two layers acting as a single alloy layer which wets well with stainless steel, high-carbon steel or ceramics and provides a strong adhesion to these materials.

The embodiment shown in FIG. 4 consists of a combination, in sequence, of a Ti layer $a_2$, Ag layer $a_1$, Cu-W alloy layer b and another Ag layer $a_1$. The top two layers $a_2$ and $a_1$ function as a single alloy system which adheres well to the ceramic. The bottom Ag layer $a_1$ wets well with ceramics and metals. Therefore, the brazing filler of the clad type shown in FIG. 4 ensures the production of a composite having a high bonding strength. The present invention is applicable to the production of metal composites with all types of ceramics, including not only oxides such as alumina and zirconia, but also nonoxides such as silicon nitride and silicon carbide.

Samples of the brazing filler according to the present invention were prepared and used in bonding various ceramics and metals, and the resulting metal-ceramic composites were checked for shear strength. The results are shown in Table 1; one of them used a brazing filler having a different composition than that specified by the present invention, and the other was exposed to an oxidizing atmosphere for making a metal-ceramic composite.

In preparing the composite samples of the invention, the following four ceramics were used.

(1) Silicon nitride (90% pure $Si_3N_4$) of a porosity of 20% that was sintered at atmospheric pressure.

(2) Silicon carbide (95% pure SiC) of a porosity of 3% that was sintered at atmospheric pressure.

(3) Sintered alumina (95% pure $Al_2O_3$) of a porosity of 3%.

(4) Sintered zirconia (90% pure $ZrO_2$) of 1% porosity that had the yttria portion stabilized.

Each of the four sintered ceramic samples was shaped to a predetermined size ($15 \times 15 \times 10$ mm) with diamond grit. After cleaning one surface of each ceramic element ($15 \times 15$ mm) with a detergent and acetone, each of the brazing filler examples of the clad type shown in Table 1 was placed on a ceramic in such a manner that the layer I was in contact with the ceramic. One of the metals listed in Table 1 was then placed on the brazing filler layer, and the assembly was heated at the temperatures shown in Table 1 in the atmosphere also shown in Table 1, so as to provide metal-ceramic composites.

The brazing filler samples of the clad type used in the shear strength test had dimensions of $15 \times 15 \times t$ mm (for the specific values of t, or filler thickness, see Table 1). The metals to be bonded to the ceramics measured $15 \times 15 \times 10$ mm. In Table 1, Nos. 1 to 13 refer to samples prepared according to the present invention, and No. 14 refers to a comparative sample. Samples Nos. 1 to 13 were characterized by brazing fillers having a sufficiently good wettability with ceramics to avoid defects such as cracking in the ceramics. Sample No. 14 used a brazing filler whose Ti content was greater than that defined by the present invention and which hence did not exhibit a sufficiently high wettability with ceramics to provide a satisfactory cohesion of the metal and ceramic. Samples Nos. 15 to 18 were heated in a hydrogen atmosphere according to the concept of the present invention. No. 19, a sample prepared by heating in air, had virtually no shear strength.

Figure 5:
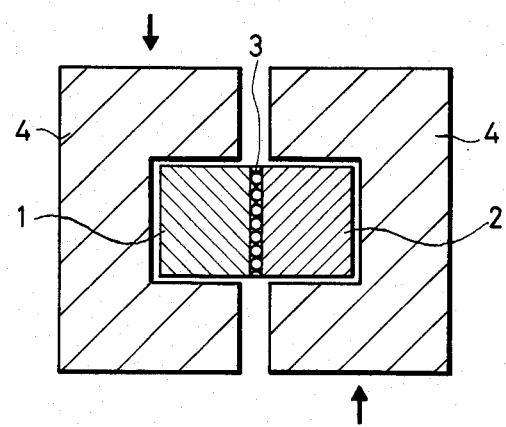
FIG. 5 is a cross section showing a metal-ceramic composite sample as fixed in clamps for measurement of the shear strength of the brazing filler.

The apparatus used to measure the shear strength of the composite examples is shown schematically in FIG. 5. A sample consisting of a ceramic 1 bonded to a metal 2 by a brazing filler 3 was fixed in clamps 4 by the metal portion 2 and the ceramic portion 1, and a load was applied to the portions 1 and 2 at a rate of 2 mm/min in the direction indicated by the arrow.

Figure 6A:
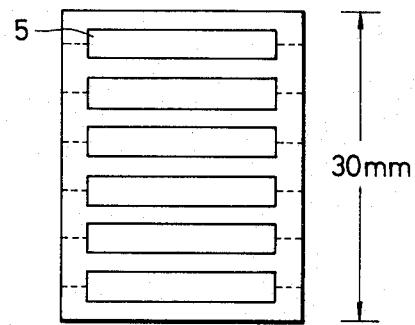
FIG. 6A is a front view of an electrode unit.
Figure 6B:
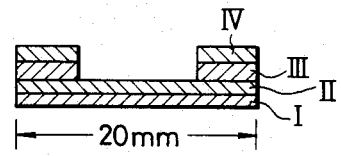
FIG. 6B is a cross section of the brazing filler as bonded to the electrode unit.

Metal-ceramic composite samples were prepared using ceramics having the same compositions as the alumina and silicon nitride used above. These were checked for electrical resistance and tensile strength. The results are shown in Table 2. Each ceramic sample was shaped to the dimensions of $1.2(t) \times 15 \times 30$ mm (t=thickness), and the thus-shaped ceramic (not shown) was coated with a brazing filler which consisted, as shown in FIG. 6B, of an Ag-Cu alloy layer I and a Ti layer II. On both edges of the filler layer (30 mm×20 mm) were formed two electrode layers consisting of a Co layer III and a Cu or Ni layer IV, each layer being 10 mm wide. FIG. 6A is a front view of the resulting assembly as shown from the top of the electrode IV. In FIG. 6A, reference numeral 5 indicates a portion having no electrode coating, and the dashed lines running through the center of each portion 5 indicate the lines along which the assembly was divided into seven sections to form test pieces. The metallized layers of each section were found to have a nearly zero electrical resistance for samples Nos. 20 to 24.

A nickel wire (0.5 mmφ) was soldered to the electrode layers of each section and the tensile strength of the bond between the metal and the brazing filler was measured. The load was applied at a rate of 20 mm/min. The test results are shown in Table 2, indicating the satisfactory performance of the brazing fillers according to the present invention.

TABLE 1

| Sample No. | Ceramic | Composition of clad brazing filler and the thicknesses (mm) of respective layers | | | | | | Metal to be bonded | Heating temp. (°C.) | Heating atmosphere | Shear Strength (kg/mm²) | Remarks |
|---|---|---|---|---|---|---|---|---|---|---|---|---|
| | | I | II | III | IV | V | VI | | | | | |
| 1 | Si₃N₄ | Ag—Cu(28)0.05 | Ti 0.03 | W 0.2 | Cu 0.5 | Ag—Cu(28)0.05 | — | carbon steel | 850 | H₂ | 13.0 | sample of the present invention |
| 2 | SiC | " | " | W 0.2 | Ag 0.5 | " | — | carbon steel | 850 | " | 5.8 | sample of the present invention |
| 3 | Al₂O₃ | " | " | Kovar 0.2 | Cu 0.5 | " | — | carbon steel | 850 | " | 10.2 | sample of the present invention |
| 4 | ZrO₂ | " | " | Cu 0.2 | — | " | — | carbon steel | 850 | " | 13.6 | sample of the present invention |
| 5' | Al₂O₃ | Cu 0.03 | Ag 0.05 | Ti 0.03 | Kovar 0.2 | Ag 0.05 | Cu 0.03 | Ni | 850 | Ar | 7.8 | sample of the present invention |
| 7 | Al₂O₃ | Ag—Cu(28)0.05 | Ti 0.03 | Fe—Ni(42)0.2 | Cu 0.25 | Ag—Cu(28)0.05 | — | carbon steel | 900 | Ar | 9.4 | sample of the present invention |
| 8 | Al₂O₃ | Ag—Cu(28)0.05 | Ti 0.03 | Cu 0.5 | — | Ag—Cu(28)0.05 | — | carbon steel | 900 | NH₃ decomposition gas | 8.7 | sample of the present invention |
| 9 | Al₂O₃ | Ag 0.05 | Ti 0.03 | Kovar 0.2 | — | Ag 0.05 | — | Ni | 1000 | Ar | 8.0 | sample of the present invention |
| 10 | Al₂O₃ | Ti 0.03 | Ag 0.05 | kovar 0.2 | — | Ag 0.05 | — | Ni | 1000 | " | 8.0 | sample of the present invention |
| 11 | Si₃N₄ | Ag 0.05 | Ti 0.03 | Mo 0.2 | Cu 0.2 | Mo 0.2 | Ag 0.05 | Ni | 1000 | " | 10.0 | sample of the present invention |
| 12 | Si₃N₄ | Ag—Cu(28)0.05 | Ti 0.03 | Cu 0.2 | Invar 0.4 | Cu 0.2 | Ag—Cu(28)0.05 | carbon steel | 850 | vacuum (10⁻⁴ Torr) | 13.3 | sample of the present invention |
| 13 | Si₃N₄ | Ag—Cu(28)0.06 | Ti 0.03 | W—cu(10)0.4 | Cu 0.2 | — | Ag—Cu(28)0.05 | carbon steel | 850 | vacuum (10⁻⁴ Torr) | 10.5 | sample of the present invention |
| 14 | Si₃N₄ | Ag—Cu(28)0.03 | Ti 0.3 | W—cu(10)0.4 | Cu 0.2 | — | Ag—Cu(28)0.05 | carbon steel | 850 | vacuum (10⁻⁴ Torr) | 0 | comparative sample |
| 5 | Al₂O₃ | Ag 0.05 | Cu 0.03 | Ti 0.03 | Kovar 0.2 | Cu 0.03 | Ag 0.05 | Ni | 850 | Ar | 7.9 | sample of the present invention |
| 6 | ZrO₂ | Cu 0.05 | Ti 0.03 | Cu 0.5 | Ag 0.05 | — | — | Ni | 1060 | " | 6.8 | sample of the present invention |
| 15 | Al₂O₃ | Ag—Cu(28)0.05 | Ti 0.03 | Ti 0.03 | — | Ti 0.03 | Ag—Cu(28)0.05 | ZrO₂ | 850 | H₂ | 10.1 | sample of the present invention |
| 16 | Al₂O₃ | Ag—Cu(28)0.05 | Ti 0.03 | Kovar 0.2 | Cu 0.5 | Ti 0.03 | Ag—Cu(28)0.05 | stainless steel | 850 | H₂ | 7.9 | sample of the present invention |

TABLE 1-continued

| Sample No. | Ceramic | Composition of clad brazing filler and the thicknesses (mm) of respective layers | | | | | | Metal to be bonded | Heating temp. (°C.) | Heating atmosphere | Shear Strength (kg/mm²) | Remarks |
| --- | --- | --- | --- | --- | --- | --- | --- | --- | --- | --- | --- | --- |
| | | I | II | III | IV | V | VI | | | | | |
| 17 | Si₃N₄ | Ag—Cu(28)0.05 | Ti 0.03 | Mo 0.2 | Cu 0.2 | Ti 0.03 | Ag—Cu(28)0.05 | ZrO₂ | 850 | H₂ | 11.0 | sample of the present invention |
| 18 | Si₃N₄ | Ag—Cu(28)0.05 | Ti 0.03 | Mo 0.2 | Cu 0.2 | Ti 0.03 | Ag—Cu(28)0.05 | stainless steel | 850 | H₂ | 10.8 | sample of the present invention |
| 19 | Si₃N₄ | Ag—Cu(28)0.05 | Ti 0.03 | Mo 0.2 | Cu 0.2 | Ti 0.03 | Ag—Cu(28)0.05 | stainless steel | 850 | air | 0 | comparative sample |
| 9' | Si₃N₄ | Ag—Cu(28)0.05 | | | | | | Si₃N₄ | 850 | H₂ | 9.5 | sample of the present invention |

TABLE 2

| Sample No. | Ceramic | Composition of clad brazing filler and the thicknesses (mm) of respective layers | | | | Heating temp. (°C.) | Heating atmosphere | Electrical resistance (Ω) | Tensile strength (kg/mm²) | Remarks |
| --- | --- | --- | --- | --- | --- | --- | --- | --- | --- | --- |
| | | I | II | III | IV | | | | | |
| 20 | Si₃N₄ | Ag—Cu(28)0.05 | Ti 0.03 | Cu 0.2 | Ni 0.5 | 850 | H₂ | 0 | 1.7 | Sample of the present invention |
| 21 | Al₂O₃ | Ag—Cu(28)0.10 | Ti 0.03 | Cu 0.2 | Ni 0.5 | 850 | H₂ | 0 | 7.0 | Sample of the present invention |
| 22 | Al₂O₃ | Ag—Cu(28)0.05 | Ti 0.03 | Kovar | — | 850 | H₂ | 0 | 7.3 | Sample of the present invention |
| 23 | Si₃N₄ | Ag—Cu(28)0.05 | Ti 0.03 | Mo 0.2 | Cu 0.5 | 850 | H₂ | 0 | 6.6 | Sample of the present invention |
| 24 | Si₃N₄ | Ag—Cu(28)0.05 | Ti 0.03 | Cu 0.2 | Mo 0.2 | 850 | H₂ | 0 | 7.3 | Sample of the present invention |

As will be apparent from the foregoing description, the brazing filler of the present invention ensures a strong metal-ceramic bond. As a further advantage, the invention provides a simple technique for providing a metal-ceramic composite having a high bonding strength.

I claim:

1. A brazing filler for use in bonding a ceramic to one of a metal, glass or ceramic, said brazing filler comprising one of a low thermal expansion metal layer, a low Young's modulus metal layer and a combination low thermal expansion metal layer and a low Young's modulus metal layer, in combination with a filler consisting of one of an Ag layer, Cu layer, Ag-Cu alloy layer, and a combination of Ag and Cu layers, and an adjacent Ti layer, the Ti content being in the range of 3 to 80% of the total weight of said brazing filler, one of said low thermal expansion metal layer and said low Young's modulus metal layer being adjacent to and integral with any one of said Ag layer, Cu layer, Ag-Cu alloy layer and Ti layer.

2. A composite prepared by the following steps: placing between a ceramic and one of a metal, glass and ceramic a brazing filler comprising one of a low thermal expansion metal layer, a low Young's modulus metal layer, and a combination low thermal expansion metal layer and a low Young's modulus metal layer, and a filler consisting of one of an Ag layer, a Cu layer, Ag-Cu alloy layer, and a combination of Ag and Cu layers, and an adjacent Ti layer, the Ti content being in the range of 3 to 80% of the total weight of said brazing filler, said ceramic being in contact with one of said Ag layer, Cu layer, Ag-Cu alloy layer, combination of Ag and Cu layers and Ti layer, said one of said low thermal expansion metal layer, low Young's modulus metal layer and said combination low thermal expansion layer and low Young's modulus metal layer being adjacent to and integral with one of said Ag layer, Cu layer, Ag-Cu alloy layer, combination of Ag and Cu layers and Ti layer that is not in contact with said ceramic; and heating the assembly in a nonoxidizing atmospshere to bond said ceramic either to said one of said metal, glass and ceramic.

* * * * *